United States Patent
Imade (10) Patent No.: US 11,760,222 B2
(45) Date of Patent: Sep. 19, 2023

(54) IN-VEHICLE POWER STORAGE SYSTEM

(71) Applicant: TOYOTA JIDOSHA KABUSHIKI KAISHA, Toyota (JP)

(72) Inventor: Yuki Imade, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/673,143

(22) Filed: Feb. 16, 2022

(65) Prior Publication Data

US 2022/0274499 A1  Sep. 1, 2022

(30) Foreign Application Priority Data

Mar. 1, 2021 (JP) .................. 2021-031751

(51) Int. Cl.
  *B60L 53/62* (2019.01)
  *B60L 58/12* (2019.01)
  *H02J 7/00* (2006.01)

(52) U.S. Cl.
  CPC ............... *B60L 53/62* (2019.02); *B60L 58/12* (2019.02); *H02J 7/0047* (2013.01)

(58) Field of Classification Search
  CPC .......... B60L 53/62; B60L 58/12; B60L 53/14; B60L 58/13; B60L 2260/44; H02J 7/0047
  See application file for complete search history.

(56) References Cited

U.S. PATENT DOCUMENTS

| | | | |
|---|---|---|---|
| 2017/0274784 A1* | 9/2017 | Nagakura | ............... B60L 58/10 |
| 2018/0244263 A1* | 8/2018 | Bower | ................ B60W 10/113 |
| 2019/0160956 A1* | 5/2019 | Ichikawa | ................ B60L 55/00 |
| 2020/0207233 A1* | 7/2020 | Sato | ........................ B60L 58/18 |

FOREIGN PATENT DOCUMENTS

JP  6308301 32  4/2018

* cited by examiner

*Primary Examiner* — Lincoln D Donovan
*Assistant Examiner* — Alex W Lam
(74) *Attorney, Agent, or Firm* — Dinsmore & Shohl LLP (57) ABSTRACT

In the event of external charging where a charging device charges a power storage device with electric power from an external electric power source, a current indication for the external charging is transmitted to the charging device. In this case, in the event of the external charging, a response speed of the charging device is estimated based on change of current in the power storage device due to change of the current indication after start of charging, and the current indication is set in consideration of the response speed of the charging device after the response speed of the charging device is estimated.

4 Claims, 7 Drawing Sheets

IN-VEHICLE POWER STORAGE SYSTEM

CROSS-REFERENCE TO RELATED APPLICATION

This application claims priority to Japanese Patent Application No. 2021-031751 filed on Mar. 1, 2021, incorporated herein by reference in its entirety.

BACKGROUND

1. Technical Field

The present disclosure relates to an in-vehicle power storage system.

2. Description of Related Art

As a technology of this type, a charging system including a charge control unit and a charging device has been proposed (see, for example, Japanese Patent No. 6308301). The charge control unit calculates chargeable electric power based on difference between a charge target voltage lower than a charge prohibited voltage and a voltage of a power storage device, and also calculates a current indication based on the chargeable electric power. The charging device charges the power storage device based on an indication from the charging control unit. In the charging system, the charge control unit calculates the current indication such that the voltage of the power storage device is maintained at the charge target voltage after the voltage of the power storage device reaches the charge target voltage. The charge control unit also stops charging the power storage device, when the voltage of the power storage device remains within an allowable voltage region, which is set within a voltage range that is above the charge target voltage and below the charge prohibited voltage, for a prescribed time or longer, or when the voltage of the power storage device reaches the charge prohibited voltage.

SUMMARY

When a current indication is lowered in the charging system where the charging device has a low response speed, followability of the current of the power storage device to the current indication tends to decrease. When the followability decreases, the voltage of the storage device may remain within the permitted voltage range or reach the charge prohibited voltage (overvoltage may occur), so that charging of the storage device is likely to stop prematurely.

A primary object of an in-vehicle power storage system of the present disclosure is to allow more appropriate charging of a power storage device even when a charging device has a low response speed.

The in-vehicle power storage system of the present disclosure adopts following means in order to accomplish the primary object.

An in-vehicle power storage system of the present disclosure is mounted in a vehicle. The in-vehicle power storage system includes: a power storage device; and a controller. The controller is configured to transmit, in the event of external charging where a charging device charges the power storage device with electric power from an external electric power source, a current indication for the external charging to the charging device. In the event of the external charging, the controller is configured to estimate a response speed of the charging device based on change of current in the power storage device due to change of the current indication after start of charging, and set the current indication in consideration of the response speed of the charging device after the response speed of the charging device is estimated.

In the in-vehicle power storage system of the present disclosure, in the event of external charging where the charging device charges the power storage device with electric power from an external electric power source, a current indication for the external charging is transmitted to the charging device. In this case, in the event of the external charging, a response speed of the charging device is estimated based on change of current in the power storage device due to change of the current indication after start of charging, and the current indication is set in consideration of the response speed of the charging device after the response speed of the charging device is estimated. Accordingly, even when the charging device has a relatively low response speed, it is possible to restrain, at the time of lowering the current indication, the followability of the current of the power storage device to the current indication from decreasing, and to thereby reduce inconveniences such as overvoltage or overcharge of the power storage device. As a result, more appropriate charging of the power storage device can be performed. Here, the charging device may be arranged outside the vehicle or be arranged inside the vehicle (provided in the vehicle). The significance of the present disclosure is greater in the former case than in the latter case because in the former case, delay in communication between the controller and the charging device is likely to cause the charging device to respond at a lower speed.

In the in-vehicle power storage system of the present disclosure, when the current indication is lowered after the response speed of the charging device is estimated in the event of the external charging, the controller may be configured to set the current indication such that a change speed of the current indication is equal to or below the response speed of the charging device. This makes it possible to restrain that the change speed of the current indication becomes larger than the response speed of the charging device, when the current indication is lowered after the response speed of the charging device is estimated. As a result, even when the charging device has a relatively low response speed, it is possible to reduce, at the time of lowering the current indication, inconveniences such as overvoltage or overcharge of the power storage device.

In this case, the controller is configured to set the current indication based on a base current indication that is based on a state of charge of the power storage device in the event of the external charging. When a temporary overage, indicating an absolute value of a change speed of the base current indication temporarily exceeding the response speed of the charging device, occurs in a case where the base current indication is lowered after the response speed of the charging device is estimated in the event of the external charging, the controller may be configured to set a limit start time based on a return time at which the absolute value of the change speed of the base current indication returns to values equal to or below the response speed of the charging device after exceeding the response speed of the charging device, the base current indication at the return time, and the response speed of the charging device, and gradually lower the current indication using the response speed of the charging device after the limit start time comes. This makes it possible to set the current indication more appropriately when the current indication is lowered.

In the in-vehicle power storage system of the present disclosure, in the event of the external charging, the controller may be configured to estimate, as the response speed of the charging device, a change speed of current of the power storage device when the current indication changes. In this way, the response speed of the charging device can be estimated more appropriately.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein.

DETAILED DESCRIPTION OF EMBODIMENTS

Now, aspects for carrying out the present disclosure will be described based on embodiments.

Figure 1:
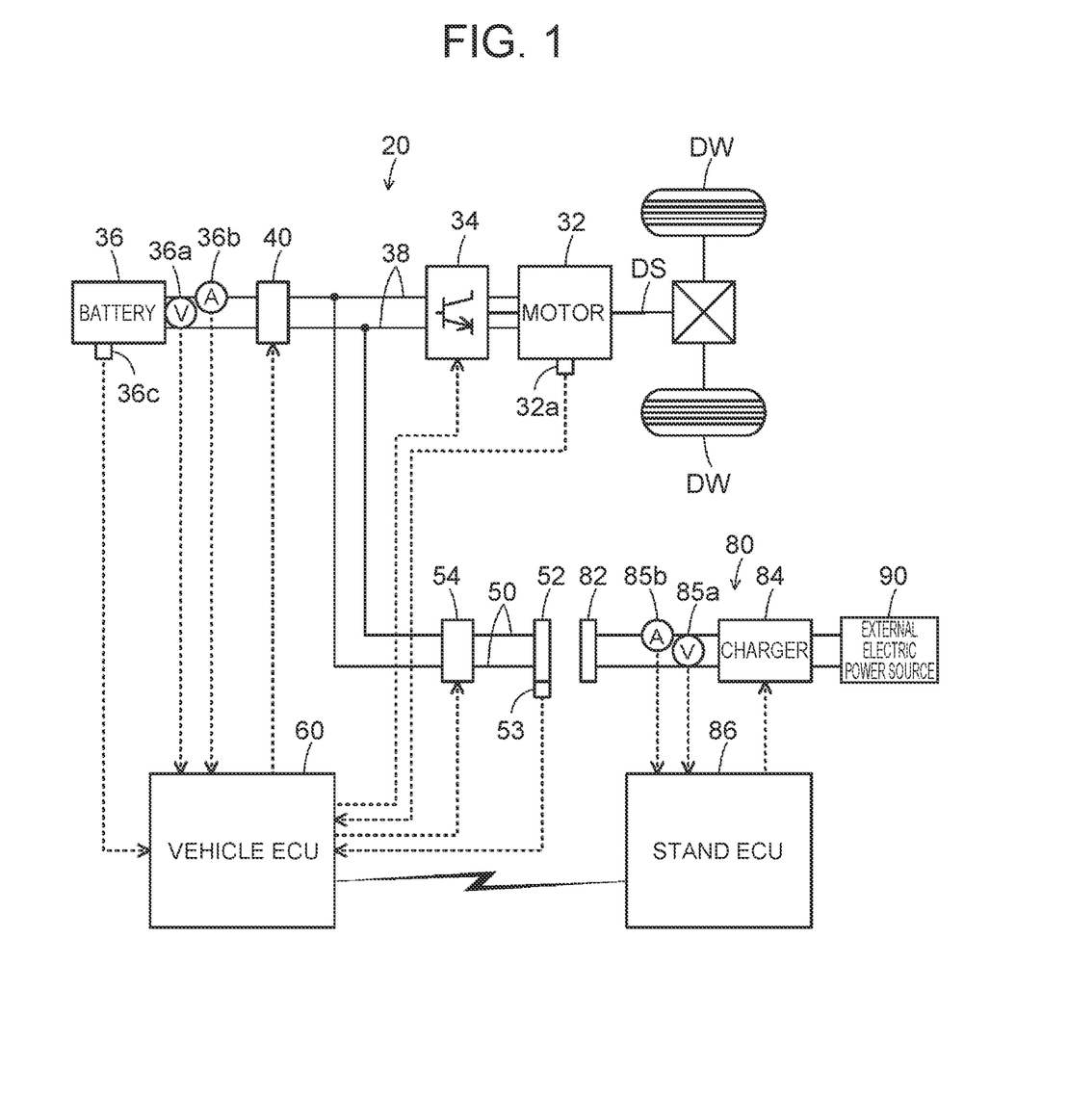
FIG. 1 is a block diagram showing an outlined configuration of an battery electric vehicle 20 including an in-vehicle power storage system as an embodiment of the present disclosure and a charge stand 80.

FIG. 1 is a block diagram showing an outlined configuration of an battery electric vehicle 20 including an in-vehicle power storage system as an embodiment of the present disclosure and a charge stand 80. As shown in the drawing, the battery electric vehicle 20 in the embodiment includes a travel motor 32, an inverter 34, a battery 36 as a power storage device, a drive electric power line 38, a system main relay 40, a charge electric power line 50, a vehicle connector 52, a charge relay 54, and an electronic control unit for a vehicle (hereinafter referred to as "vehicle ECU") 60. The in-vehicle power storage system of the embodiment corresponds to the battery 36 and the vehicle ECU 60.

The motor 32 is configured, for example, as a synchronous generator-motor, and a rotor of the motor 32 is connected to a driving shaft DS coupled to driving wheels DW through a differential gear. The inverter 34 is connected with the motor 32 and is also connected with the drive electric power line 38. The motor 32 is rotationally driven by switching control of a plurality of switching elements of the inverter 34, which are not illustrated.

For example, the battery 36 is configured as a lithium-ion secondary battery or a nickel-hydrogen secondary battery. The battery 36 is connected to the drive electric power line 38. The system main relay 40 is provided in the drive electric power line 38 for connection and disconnection between the inverter 34 side and the battery 36 side.

One end of the charge electric power line 50 is connected to a portion of the drive electric power line 38 that is closer to the inverter 34 side than to the system main relay 40, and the other end is connected to the vehicle connector 52. The vehicle connector 52 is configured to be connectable to a stand connector 82 of a charge stand 80 at home, a charging station, or the like. The charge relay 54 is provided in the charge electric power line 50 for connection and disconnection between the vehicle connector 52 side and the drive electric power line 38 side.

The vehicle ECU 60 includes a microprocessor having a CPU, a ROM, a RAM, a flash memory, input-output ports, and a communication port which are not illustrated. The vehicle ECU 60 receives signals from various sensors through input ports. Examples of the signals input into the vehicle ECU 60 may include a rotational position Om of the rotor of the motor 32 from a rotational position detection sensor (e.g., a resolver) 32a that detects a rotational position of the rotor of the motor 32. Examples of the signals may also include a voltage Vb of the battery 36 from a voltage sensor 36a attached across the terminals of the battery 36, a current Ib of the battery 36 from a current sensor 36b attached to an output terminal of the battery 36, and a temperature Tb of the battery 36 from a temperature sensor 36c attached to the battery 36. Examples of the signals may also include a connection signal from a connection sensor 53 provided on the vehicle connector 52. Since the vehicle ECU 60 also functions as a drive controller for the vehicle, the vehicle ECU 60 also receives information necessary for travel control. Examples of the information may include a start signal from a start switch, a shift position from a shift position sensor that detects an operation position of a shift lever, an accelerator operation amount from an accelerator pedal position sensor that detects a pressing amount of an accelerator pedal, a brake pedal position from a brake pedal position sensor that detects a pressing amount of a brake pedal, and a vehicle speed from a vehicle speed sensor.

The vehicle ECU 60 outputs various control signals through output ports. Examples of the signals output from the vehicle ECU 60 may include switching control signals to a plurality of switching elements of the inverter 34, a control signal to the system main relay 40, and a control signal to the charge relay 54. The vehicle ECU 60 calculates a state of charge SOC of the battery 36 based on the current Ib of the battery 36 from the current sensor 36b. The vehicle ECU 60 can wirelessly communicate with an electronic control unit for a stand (hereinafter referred to as "stand ECU") 86 of the charge stand 80 at home, at a charging station, or the like.

The charge stand 80 includes a stand connector 82, a charger 84, and the stand ECU 86. The stand connector 82 is configured to be connectable to the vehicle connector 52 of the battery electric vehicle 20. The charger 84 is connected to an external electric power source 90 that is configured as an alternating-current electric power source, such as a domestic electric power source and a commercial electric power source. The charger 84 is also connected to the stand connector 82. When the vehicle connector 52 and the stand connector 82 are connected, and charging of the battery 36 is instructed, alternating-current electric power from the external electric power source 90 is converted to direct-current electric power, and the converted electric power (voltage and current) is regulated so as to be supplied to the battery electric vehicle 20.

The stand ECU 86 includes a microprocessor having a CPU, a ROM, a RAM, a flash memory, input-output ports, and a communication port which are not illustrated. The stand ECU 86 receives signals from various sensors through input ports. Examples of the signals input into the stand ECU 86 may include an output voltage Vc of the charger 84 from a voltage sensor 85a attached across output-side terminals of the charger 84, and an output current Ic of the charger 84 from a current sensor 85b attached to the output terminal of the charger 84. The stand ECU 86 outputs various control signals through output ports. Examples of the signals output from the stand ECU 86 may include a control signal to the charger 84. The stand ECU 86 can wirelessly communicate with the vehicle ECU 60 of the battery electric vehicle 20.

In the thus-configured battery electric vehicle 20 in the embodiment, when the vehicle connector 52 and the stand connector 82 are connected while the battery electric vehicle 20 stops at home, at a charging station, or the like, with the system being in an OFF state, the connection sensor 53 transmits a connection signal to the vehicle ECU 60, and the vehicle ECU 60 detects connection between the vehicle connector 52 and the stand connector 82. Then, when a user instructs external charging to charge the battery 36 with electric power from the external electric power source 90 (charge stand 80), the vehicle ECU 60 first turns on the system main relay 40 and the charge relay 54. The vehicle ECU 60 then transmits a current indication Ic* for external charging to the stand ECU 86, and the stand ECU 86 controls the charger 84 such that an output current Ic of the charger 84 is equal to the current indication Ic*. This is how external charging is performed. Once the state of charge SOC of the battery 36 reaches a prescribed state of charge Sch (e.g. 80% to 95%), the vehicle ECU 60 transmits an indication to end the external charging to the stand ECU 86. Upon reception of the indication, the stand ECU 86 stops the charger 84. This is how the external charging is ended. The vehicle ECU 60 then turns off the system main relay 40 and the charge relay 54.

Figure 2:
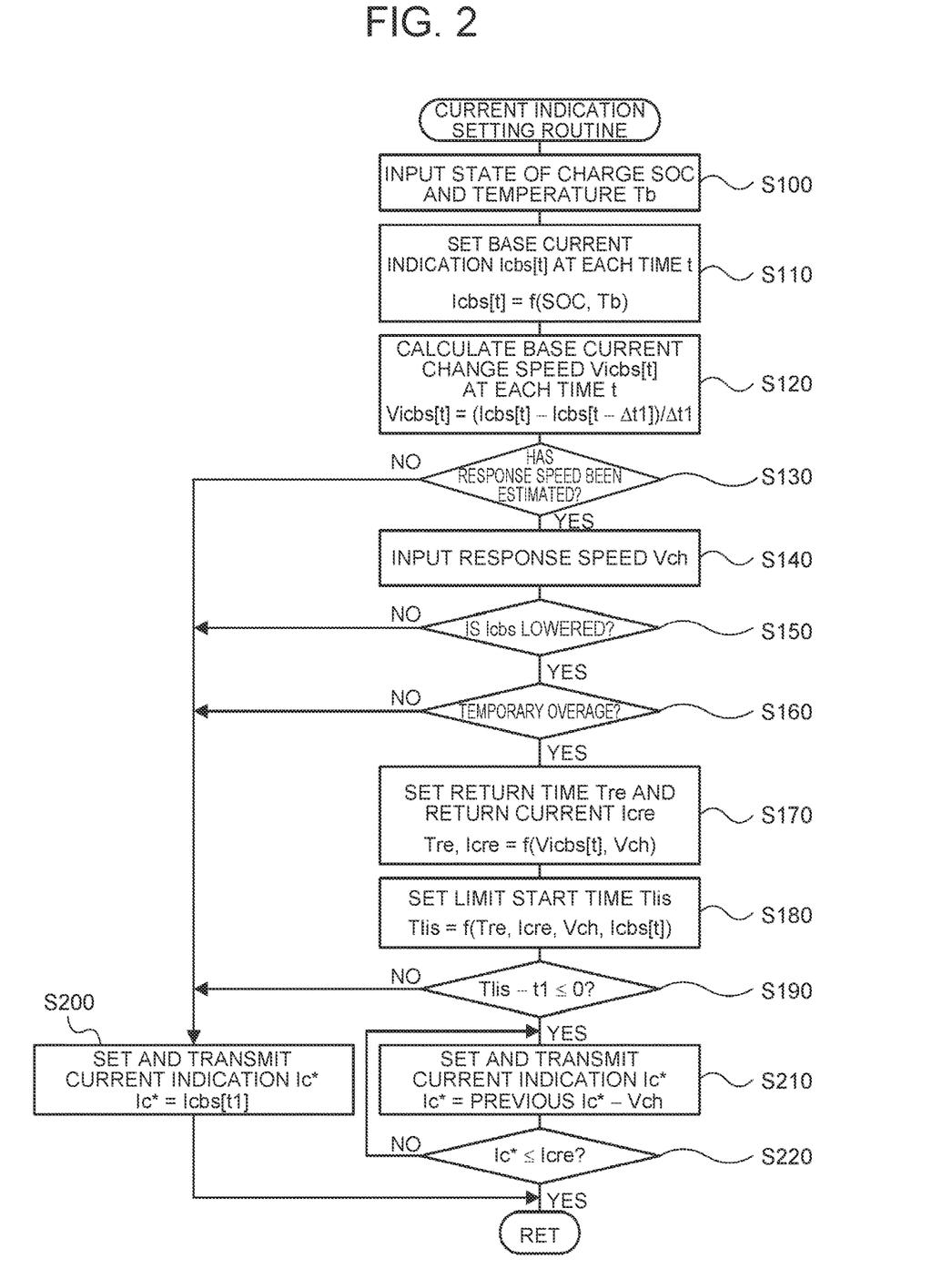
FIG. 2 is a flowchart showing an example of a current indication setting routine executed by a vehicle ECU 60.

Description is now given of the operation of the thus-configured battery electric vehicle 20 of the embodiment, and particularly the process of the vehicle ECU 60 setting the current indication Ic* in the event of external charging. FIG. 2 is a flowchart showing an example of a current indication setting routine executed by the vehicle ECU 60. The routine is repeatedly executed in the event of external charging.

When the current indication setting routine of FIG. 2 is executed, the vehicle ECU 60 inputs data such as the state of charge SOC and temperature Tb of the battery 36 (step S100). Here, a value calculated based on the current Ib of the battery 36 detected by the current sensor 36b is input as the state of charge SOC of the battery 36. As the temperature Tb of the battery 36, a value detected by the temperature sensor 36c is input.

Once the data is input, the vehicle ECU 60 sets a base current indication Icbs[t] at each time t in the future (latest time t1 to time t2 that is some time after time t1) based on the input state of charge SOC and temperature Tb of the battery 36 (step S110). Here, the base current indication Icbs[t] at each time t is a base value of the current indication Ic*[t] at each time t. For example, the base current indication Icbs[t] can be set by applying the state of charge SOC and the temperature Tb of the battery 36 to a base current indication setting map. The base current indication setting map is set as a relationship between the state of charge SOC and the temperature Tb of the battery 36 and the base current indication Icbs[t] at each time t in advance by an experiment or analysis, and is stored in the ROM or the flash memory of the vehicle ECU 60.

Next, the vehicle ECU 60 sets a base current change speed Vicbs[t] at each time t from time t1 to t2 excluding time t1, based on the base current indication Icbs[t] at each time t from time t1 to t2 (step S120). Here, the base current change speed Vicbs[t] at each time t is a change amount per unit time in the base current indication Icbs[t] at each time t. For example, the base current change speed Vicbs[t] at each time t can be calculated by dividing a value, resultant from subtracting a base current indication Icbs[t−Δt1] at time (t−Δt1) from the base current indication Icbs[t] at time t, by time interval Δt1 between time t and time (t−Δt1).

Then, the vehicle ECU 60 determines whether or not a response speed Vch of the charge stand 80 in the event of external charging has been estimated (step S130). Here, the response speed Vch of the charge stand 80 is the speed related to delay in response from the time when the vehicle ECU 60 transmits the current indication Ic* to the stand ECU 86 to the time when the stand ECU 86 controls the charger 84 so that the current indication Ic* is reflected upon the current Ib of the battery 36. The response speed Vch is calculated by a response speed estimation routine in FIG. 3. Hereinafter, description of the current indication setting routine of FIG. 2 is interrupted to describe the response speed estimation routine of FIG. 3.

Figure 3:
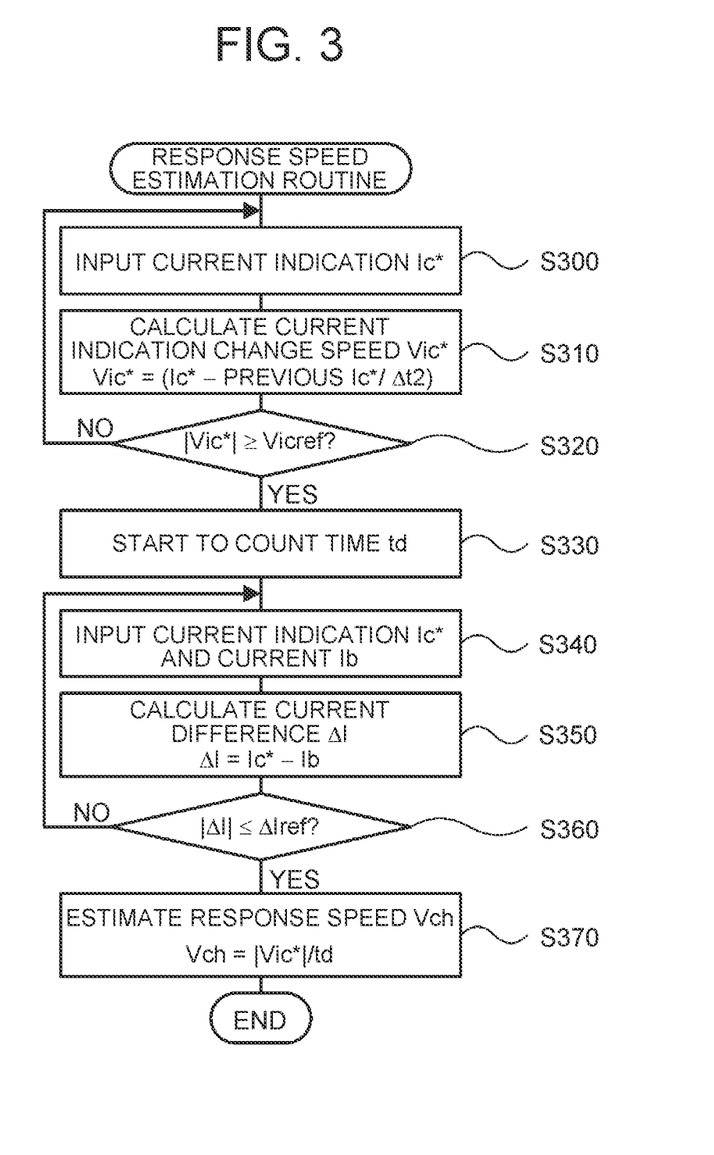
FIG. 3 is a flowchart showing an example of a response speed estimation routine executed by the vehicle ECU 60.

The response speed estimation routine in FIG. 3 starts when execution of the external charging is instructed. When the routine is executed, the vehicle ECU 60 first inputs the current indication Ic* (step S300). Here, the current indication Ic* is set by the vehicle ECU 60 to a value zero or set to a latest value that is transmitted to the stand ECU 86 of the charge stand 80 by the current indication setting routine in FIG. 2.

Next, the vehicle ECU 60 calculates a current indication change speed Vic* by subtracting a previous current indication (previous Ic*) from the current indication Ic* and dividing the resultant value by time interval Δt2 as an acquisition interval of the current indication Ic* (step S310). The vehicle ECU 60 compares an absolute value of the calculated current indication change speed Vic* with a threshold Vicref (step S320). Here, the time interval Δt2 is identical to the time interval t1. The threshold value Vicref is used to determine whether or not the current indication Ic* has changed significantly to some extent. In the embodiment, the current indication Ic* is set to change stepwise from the value "0" to a relatively large positive value Ic1 at the start of external charging. Therefore, the process of step S320 is to determine whether it is before or at the start of external charging. When the absolute value of the current indication change speed Vic* is less than the threshold of Vicref in step S320, the vehicle ECU 60 determines that it is before the start of external charging, and returns to step S300.

When the absolute value of the current indication change speed Vic* is equal to or more than the threshold Vicref in step S320, the vehicle ECU 60 determines that it is at the start of external charging, and starts to count time td (step S330). Next, the vehicle ECU 60 inputs the current indication Ic* as in the process of step S300, and also inputs the current Ib of the battery 36 (step S340). Here, as the current Ib of the battery 36, a value detected by the current sensor 36b is input.

Then, the vehicle ECU 60 calculates a current difference ΔI by subtracting the current Ib of the battery 36 from the current indication Ic* (step S350), and compares an absolute value of the calculated current difference ΔI with a threshold ΔIref (step S360). Here, the threshold ΔIref is used to determine whether the current Ib of the battery 36 is sufficiently close to the current indication Ic*. When the absolute value of the current difference ΔI is larger than the threshold ΔIref, the vehicle ECU 60 determines that the current Ib of the battery 36 is not yet sufficiently close to the current indication Ic*, and returns to step S340.

When the absolute value of the current difference ΔI is equal to or below the threshold ΔIref in step S360, the vehicle ECU 60 determines that the current Ib of the battery 36 is sufficiently close to the current indication Ic*. Accordingly, the vehicle ECU 60 divides the absolute value of the current indication change speed Vic* calculated in step S310 by time td, and estimates the resultant value as the response speed Vch of the charge stand 80 (step S370), and then ends the routine.

Figure 4:
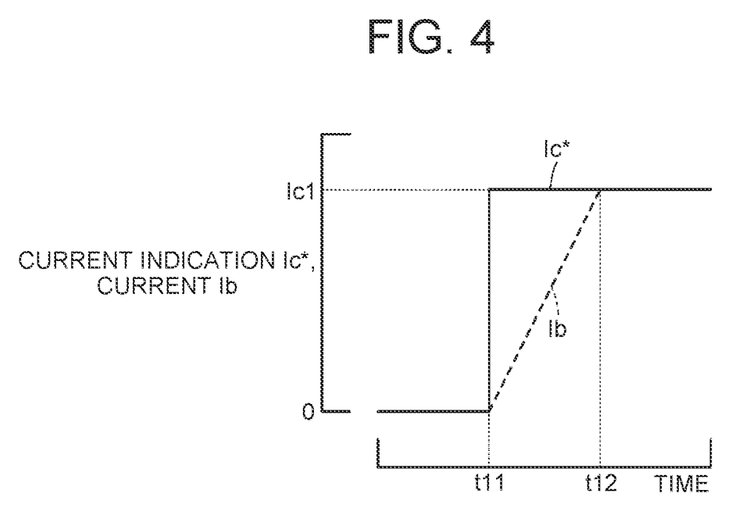
FIG. 4 is an explanatory view showing an example of a current indication Ic* and a current Ib of a battery 36 at the start of external charging.

FIG. 4 is an explanatory view showing examples of the current indication Ic* and the current Ib of the battery 36 at the start of external charging. In the example of FIG. 4, the current indication Ic* is changed stepwise from the value "0" to the positive value Ic1 at time t11, and then at time t12, the current Ib of the battery 36 is sufficiently close to the current indication Ic*. In this case, a value resultant from subtracting the value "0" from the value Ic1 corresponds to the current indication change speed Vic*, and the time (t12−t11) corresponds to time td. Therefore, the rising speed of the current Ib of the battery 36 obtained by dividing the value Ic1 by time (t12−t11) is calculated as the response speed Vch of the charge stand 80.

Now, the current indication setting routine of FIG. 2 is described again. When determination is made in step S130 that the response speed Vch of the charge stand 80 has not been estimated, the vehicle ECU 60 sets the base current indication Icbs[t1] at latest time t1 to the current indication Ic*, transmits the current indication Ic* to the stand ECU 86 (step S200), and ends the routine. As described before, at the start of external charging, the current indication Ic* is changed stepwise from the value "0" to the relatively large positive value Ic1.

When determination is made in step S130 that the response speed Vch of the charge stand 80 has been estimated, the vehicle ECU 60 inputs the response speed Vch of the charge stand 80 (step S140). Then, by referring to the base current indication Icbs[t] at each time t from time t1 to t2 in chronological order, the vehicle ECU 60 predicts whether or not to lower the base current indication Icbs (current indication Ic*) (step S150). When prediction is made that the base current indication Icbs (current indication Ic*) is lowered, the vehicle ECU 60 refers to a base current change speed Vicbs[t] at each time t from time t1 to time t2 in chronological order to predict whether or not a temporary overage, indicating an absolute value of the base current change speed Vicbs temporarily exceeding the response speed Vch of the charge stand 80, occurs (step S160). When prediction is made in step S150 that the base current indication Icbs (current indication Ic*) is not lowered, or when prediction is made in step S150 that the base current indication Icbs is lowered and prediction is made in step S160 that the temporary overage does not occur, the vehicle ECU 60 sets the base current indication Icbs[t1] at latest time t1 to the current indication Ic*, transmits the current indication Ic* to the stand ECU 86 (step S200), and ends the routine.

Figure 5:
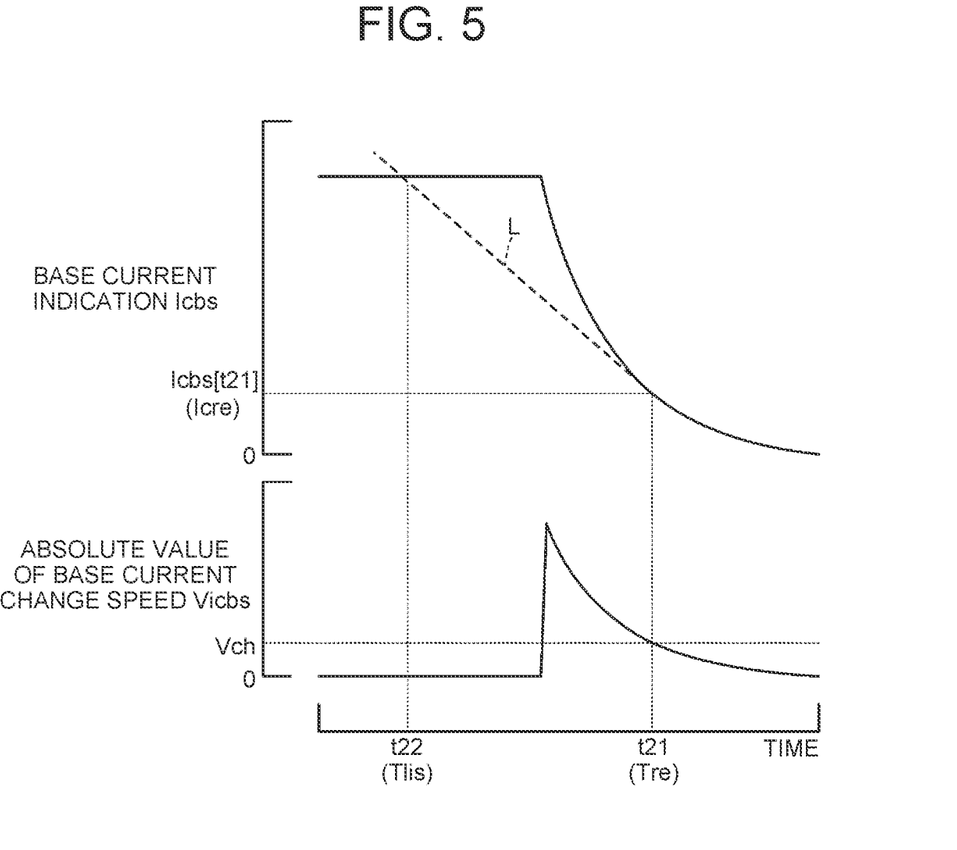
FIG. 5 is an explanatory view showing examples of a base current indication Icbs, an absolute value of the base current change speed Vicbs, and a response speed Vch of the charge stand 80 when a temporary overage occurs.

The process of step S150 can be performed by comparing the base current indication Icbs[t] at each time t with a base current indication Icbs[t−Δt1] at each time (t−Δt1) in chronological order, for example. The process of step S160 can be performed by comparing the base current change speed Vicbs[t] at each time t with the response speed Vch of the charge stand 80 in chronological order, for example. In external charging, when the state of charge SOC of the battery 36 approaches the prescribed state of charge Sch, the base current indication Icbs is lowered for reasons such as to prevent overvoltage or overcharging of the battery 36. In this case, the absolute value of the base current change speed Vicbs temporarily increases. When the response speed Vch of the charge stand 80 is relatively low, a temporary overage may occur. The processes of step S150 and S160 are performed in consideration of the temporary overage. FIG. 5 is an explanatory view showing examples of the base current indication Icbs, the absolute value of the base current change speed Vicbs, and the response speed Vch of the charge stand 80 when a temporary overage occurs. Hereinafter, the process to cope with the temporary overage will be described with reference to FIG. 5.

When prediction is made in step S150 that the base current indication Icbs (current indication Ic*) is lowered and prediction is made in step S160 that the temporary overage occurs, the vehicle ECU 60 sets return time Tre and return current Icre (step S170). Here, the return time Tre is the time when the absolute value of the base current change speed Vicbs exceeds the response speed Vch of the charge stand 80 and then returns to values equal to or below the response speed Vch. The return current Icre is the base current indication Icbs[Tre] at the return time Tre. The process can be performed by comparing the base current change speed Vicbs[t] at each time t from time t1 to t2 with the response speed Vch of the charge stand 80, for example. In the example of FIG. 5, time t21 is set to the return time Tre, and the base current indication Icbs[t21] at time t21 is set to the return current Icre.

Next, the vehicle ECU 60 sets a limit start time Tlis based on the return time Tre, the return current Icre, the response speed Vch of the charge stand 80, the base current indication Icbs[t] at each time t from time t1 to t2 and before time t1 (step S180). Here, as the base current indication Icbs[t] at each time t before time t1, values set when the routine was executed in the past are used. The limit start time Tlis is the time to start a limit process that is to limit the current indication Ic* to the base current indication Icbs. For example, the process of step S180 may be performed by: calculating the limit current Ili[t] at time t by an expression (1) using the return time Tre, the return current Icre, and the response speed Vch of the charge stand 80; executing a process of comparing the limit current Ili[t] at time t and the base current indication Icbs[t], with the time t being changed in reverse chronological order from the return time Tre; and setting the earliest time, which satisfies a condition that the limit current Ili is less than the base current indication Icbs, to the limit start time Tlis. As shown by the expression (1), the limit current Ili increases in reverse chronological order with an inclination of the response speed Vch of the charge stand 80. In the example in FIG. 5, a current value at each time t in a dashed straight line L corresponding to the expression (1) is set to the limit current Ili[t], and the earliest time t22, which satisfies the condition that the limit current Ili is less than the base current indication Icbs, is set as the limit start time Tlis.

$$Ili[t] = Icre - Vch \cdot (t - Tre) \qquad (1)$$

Moreover, a value obtained by subtracting latest time t1 from limit start time Tlis is compared with the value "0" (step S190). This process is to determine whether or not to start the limit process. When the value obtained by subtracting time t1 from limit start time Tlis is positive, the vehicle ECU 60 determines not to start the limit process. Accordingly, the vehicle ECU 60 sets the base current indication Icbs[t1] at latest time t1 to the current indication Ic*, transmits the current indication Ic* to the stand ECU 86 (step S200), and ends the routine.

When the value obtained by subtracting time t1 from limit start time Tlis is equal to or below the value "0" in step S190, the vehicle ECU 60 determines to start the limit process. Accordingly, the vehicle ECU 60 sets a value, obtained by subtracting the response speed Vch of the charge stand 80 from the previous current indication Ic*, to the current indication Ic*, transmits the current indication Ic* to the stand ECU 86 (step S210), and compares the current indication Ic* with the return current Icre (step S220). When the current indication Ic* is larger than the return current Icre, the vehicle ECU 60 returns to step S210. By repeatedly executing the steps S210 and S220, the current indication Ic* is lowered in units of the response speed Vch in the limit process. In this case, the current indication Ic* approximately corresponds to the limit current Ili. Therefore, when the base current indication Icbs (current indication Ic*) is lowered after the response speed Vch of the charge stand 80 is estimated, it is possible to restrain the absolute value of the current indication change speed Vic* (which can be calculated as in the process of step S310 in the response speed estimation routine of FIG. 3) from becoming larger than the response speed Vch of the charge stand 80. As a result, even when the charge stand 80 has a relatively low response speed Vch, it is possible to restrain, at the time of lowering the current indication Ic*, the followability of the current Ib of the battery 36 to the current indication Ic* from being decreased, and to thereby reduce inconveniences such as overvoltage or overcharge of the battery 36. As a result, more appropriate charging of the battery 36 can be performed.

When the current indication Ic* reaches the return current Icre or below in step S220, the vehicle ECU 60 ends the limit process and ends the routine. Given the case where the current indication Ic* becomes equal to or below the return current Icre while the base current indication Icbs (current indication Ic*) is lowering, the processes of steps S100 to S160 and S200 are basically executed, the next time the routine is executed. When the state of charge SOC of the battery 36 reaches the prescribed state of charge Sch before the current indication Ic* reaches the return current Icre or below, the limit process is ended by terminating the external charging as described before.

Figure 6:
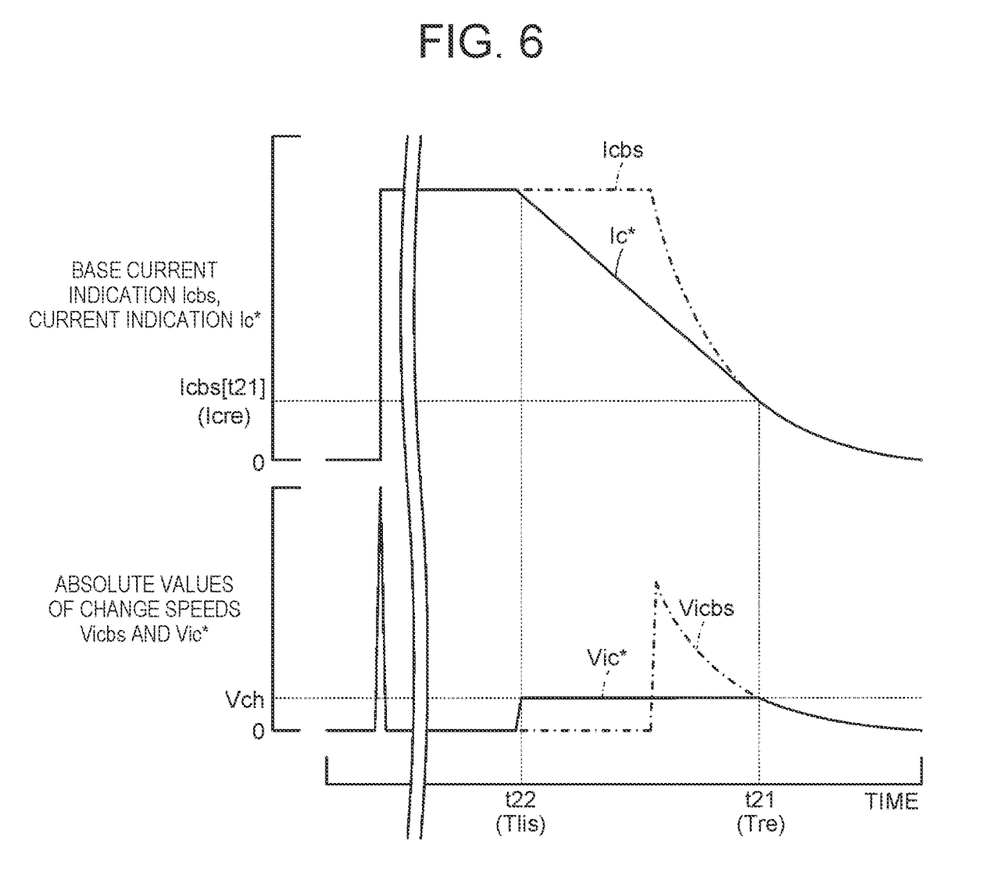
FIG. 6 is an explanatory view showing examples of the base current indication Icbs, the current indication Ic*, the absolute value of the base current change speed Vicbs, an absolute value of the current indication change speed Vic*, the response speed Vch of the charge stand 80 in the event of external charging.

FIG. 6 is an explanatory view showing examples of the base current indication Icbs, the current indication Ic*, the absolute value of the base current change speed Vicbs, the absolute value of the current indication change speed Vic*, and the response speed Vch of the charge stand 80 in the event of external charging. Here, the current indication change speed Vic* is calculated in the same way as in step S310 of the response speed estimation routine in FIG. 3. In FIG. 6, time t21 (return time Tre), the base current indication Icbs[t21] (return current Icre), and time t22 (limit start time Tlis) are similar to those in FIG. 5.

As illustrated in FIG. 6, in the event of external charging, before the limit start time Tlis, the base current indication Icbs is set to the current indication Ic*. After the limit start time Tlis, the current indication Ic* is lowered from the previous value in units of the response speed Vch of the charge stand 80. After the return time Tre, the base current indication Icbs is set to the current indication Ic*. Therefore, after the response speed Vch of the charge stand 80 is estimated, it is possible to restrain the absolute value of the current indication change speed Vic* from becoming larger than the response speed Vch of the charge stand 80. As a result, even when the charge stand 80 has a relatively low response speed Vch, it is possible to restrain, at the time of lowering the current indication Ic*, the followability of the current Ib of the battery 36 to the current indication Ic* from being decreased, and to thereby reduce inconveniences such as overvoltage or overcharge of the battery 36. As a result, more appropriate charging of the battery 36 can be performed. When the current indication Ic* is increased in occasions such as at start of external charging, the current Ib of the battery 36 is smaller than the current indication Ic* (the current Ib increases with a delay from the current indication Ic*). Accordingly, even when the current indication change speed Vic* becomes larger than the response speed Vch of the charge stand 80, it is unlikely that inconveniences such as overvoltage or overcharge of the battery 36 occur.

In the battery electric vehicle 20 in the embodiment described above, in the event of external charging, the vehicle ECU 60 transmits the current indication Ic* based on the base current indication Icbs to the stand ECU 86, and the stand ECU 86 controls the charger 84 based on the current indication Ic*. In this case, the vehicle ECU 60 calculates the rising speed of the battery 36 at the start of external charging (when the current indication Ic* is increased from the value "0" to the value Ic1) as the response speed Vch of the charge stand 80. Then, the vehicle ECU 60 sets the current indication Ic* such that the current indication change speed Vic* is equal to the response speed Vch of the charge stand 80, when prediction is made that the base current indication Icbs is lowered and that temporary overage occurs. As a result, even when the charge stand 80 has a relatively low response speed Vch, it is possible to restrain, at the time of lowering the current indication Ic*, the followability of the current Ib of the battery 36 to the current indication Ic* from being decreased, and to thereby reduce inconveniences such as overvoltage or overcharge of the battery 36. As a result, more appropriate charging of the battery 36 can be performed.

Figure 7:
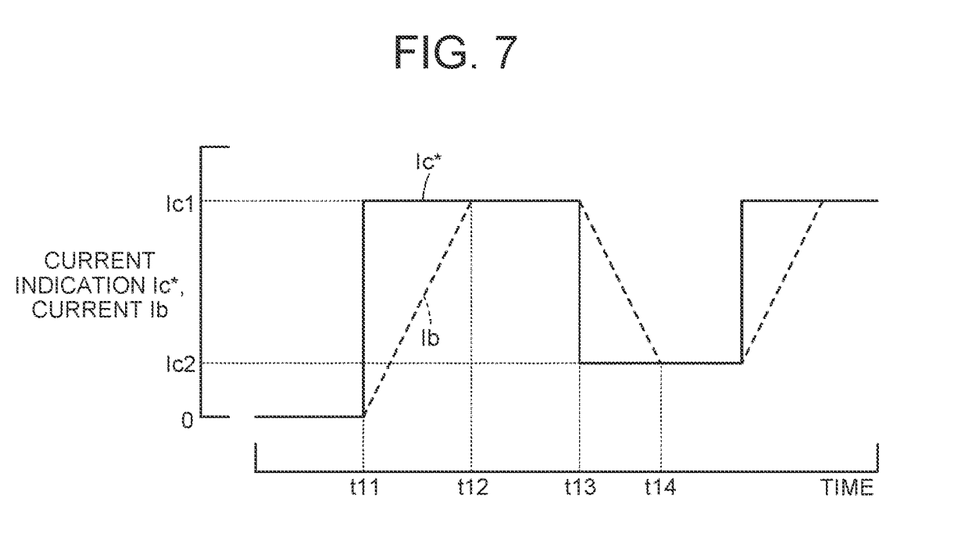
FIG. 7 is an explanatory view showing an example of the current indication Ic* and the current Ib of the battery 36 during external charging.

As shown in FIG. 4, the battery electric vehicle 20 in the embodiment calculates, as the response speed Vch of the charge stand 80, the rising speed of the current Ib of the battery 36 at the start of external charging, that is, when the current indication Ic* is changed stepwise from the value "0" to the relatively large positive value Ic1. However, as shown in FIG. 7, after the start of external charging, for calculation of the response speed Vch, the battery electric vehicle 20 may calculate, as the response speed Vch of the charge stand 80, a rising speed of the current Ib of the battery 36 obtained by: lowering the current indication Ic* from the value Ic1 to a value Ic2 (0≤Ic2<Ic1) and then returning the current indication Ic* to the value Ic1; and dividing the absolute value of the current indication change speed Vic* (=Ic2−Ic1) by time td (=t14−t13). As described before, since the present disclosure discusses the temporary overage at the time of lowing the base current indication Icbs, in some embodiments, the rising speed of the current Ib of the battery 36 is calculated as the response speed Vch of the charge stand 80 as in a modification than to calculate the rising speed of the current Ib of the battery 36 as the response speed Vch of the charge stand 80 in the embodiment. Note that the value Ic2 is set within the range that the battery 36 can be protected when the current Ib of the battery 36 lowers with a delay from the current indication Ic*.

In the event of external charging, the battery electric vehicle 20 in the embodiment sets the limit start time Tlis in step S180. When the value (Tlis−t1) obtained by subtracting time t1 from limit start time Tlis is positive in step S190, the limit process is not started. When the value (Tlis−t1) becomes equal to or below the value "0" in step S190, the limitation process is started. However, the limit current Ili[t] at time t1 may be calculated by the expression (1). When the limit current Ili[t1] at time t1 is equal to or above the base current indication Icbs[t1], the limit process may not be started. When the limit current Ili[t1] is less than the base current indication Icbs[t1], the limit process may be started.

In the event of external charging, the battery electric vehicle 20 in the embodiment sets the current indication Ic* such that the current indication change speed Vic* is equal to the response speed Vch of the charge stand 80, when prediction is made that the base current indication Icbs is lowered and that temporary overage occurs. However, in this case, the current indication Ic* may only be set such that the current indication change speed Vic* is equal to or below the response speed Vch. For example, the current indication Ic* may be set such that the current indication change speed Vic* is slightly lower than the response speed Vch.

Figure 8:
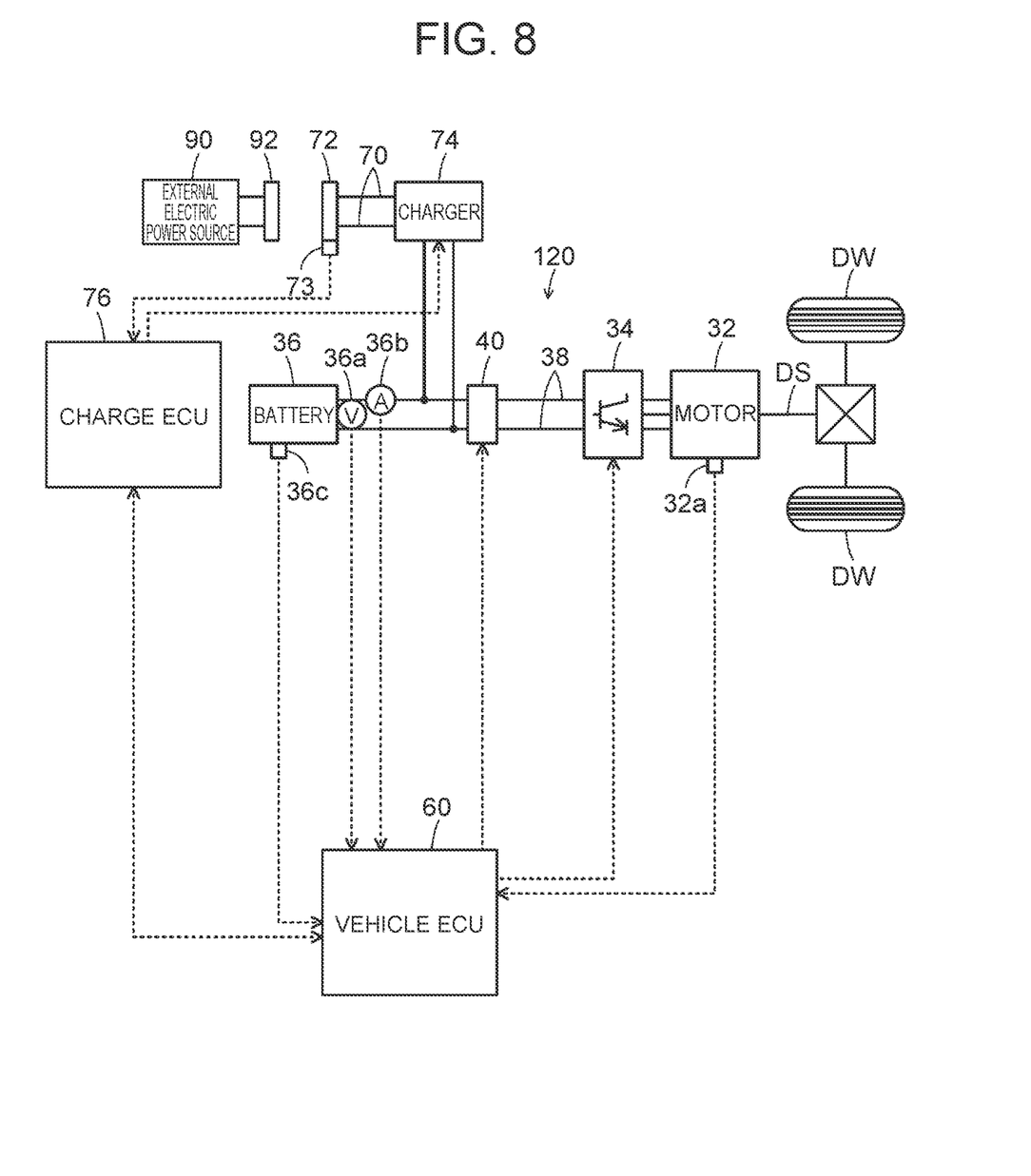
FIG. 8 is a block diagram showing an outlined configuration of an battery electric vehicle 120 in a modification.

The battery electric vehicle 20 in the embodiment includes the charge electric power line 50 for charging with direct-current electric power (DC charging), the vehicle connector 52, and the charge relay 54. However, the configuration of an battery electric vehicle 120 in a modification in FIG. 8 may also be possible. The battery electric vehicle 120 in FIG. 8 is different from the battery electric vehicle 20 in FIG. 1 in that a charging device 68 for charging with alternating-current electric power (AC charging) is provided instead of the charge electric power line 50, the vehicle connector 52, and the charge relay 54. The charging device 68 includes a charge electric power line 70, a vehicle connector 72, a charger 74, and charge electronic control unit (hereinafter referred to as "charge ECU") 76.

One end of the charge electric power line 70 is connected to a portion of the drive electric power line 38 that is closer to the battery 36 side than to the system main relay 40, and the other end is connected to the vehicle connector 72. The vehicle connector 72 is configured to be connectable to an electric power source connector that is connected to an alternate-current external electric power source 90 at home, at a charging station, or the like. The charger 74 is provided in the charge electric power line 70 and configured to be able to convert the alternating-current electric power from the external electric power source to direct-current electric power, perform voltage (electric power) regulation, and supply the electric power to the battery 36 side.

The charge ECU 76 includes a microprocessor having a CPU, a ROM, a RAM, a flash memory, input-output ports, and a communication port which are not illustrated. The charge ECU 76 receives signals from various sensors through input ports. Examples of the signals input into the charge ECU 76 may include a connection signal from a connection sensor 73 provided in the vehicle connector 72. The charge ECU 76 outputs various control signals through output ports. Examples of the signals output from the charge ECU 76 may include a control signal to the charger 74. The charge ECU 76 can communicate with the vehicle ECU 60.

In the thus-configured battery electric vehicle 120 in the modification, when the vehicle connector 72 and the electric power source connector 92 are connected while the battery electric vehicle 120 stops at home, at a charging station, or the like, with the system being in an OFF state, the connection sensor 73 transmits a connection signal to the vehicle ECU 60 through the charge ECU 76, and the charge ECU 76 and the vehicle ECU 60 detect connection between the vehicle connector 72 and the electric power source connector 92. Next, when a user instructs external charging to charge the battery 36 with electric power from the external electric power source 90, the vehicle ECU 60 transmits a current indication Ic2* for external charging to the charge ECU 76. The charge ECU 76 controls the charger 74 such that the current Ic2 on the output side of the charger 74 is equal to the current indication Ic2*. This is how external charging is performed. Once the state of charge SOC of the battery 36 reaches the prescribed state of charge Sch, the vehicle ECU 60 transmits an indication to end the external charging to the charge ECU 76. Upon reception of the indication, the charge ECU 76 stops the charger 74. This is how the external charging is ended.

The battery electric vehicle 120 in the modification can achieve the same effect as the embodiment by executing routines similar to the response speed estimation routine in FIG. 3 and the current indication setting routine in FIG. 2 to calculate the response speed Vch2 of the charging device 68 and to set the current indication Ic2*.

The battery electric vehicle 20 in the embodiment includes the charge electric power line 50 for DC charging, the vehicle connector 52, and the charge relay 54. The battery electric vehicle 120 in the modification includes the charging device 68 for AC charging (the charge electric power line 70, the vehicle connector 72, and the charger 74). However, the battery electric vehicle 120 may include the charge electric power line 50 for DC charging, the vehicle connector 52, the charge relay 54, and the charging device 68 for AC charging (the charge electric power line 70, the vehicle connector 72, and the charger 74).

The battery electric vehicle 20 in the embodiment and the battery electric vehicle 120 in the modification use the battery 36 as a power storage device. However, the battery electric vehicles 20, 120 may use a capacitor as the power storage device.

In the embodiment, the in-vehicle power storage system is configured to be mounted in the battery electric vehicle 20 including the motor 32 and the battery 36. However, the in-vehicle power storage system may be configured to be mounted in vehicles other than the battery electric vehicle 20, such as a hybrid vehicle including an engine in addition to the configuration similar to that of the battery electric vehicle 20, and a fuel cell vehicle including a fuel cell in addition to the configuration similar to that of the battery electric vehicle 20.

Description is given of correspondence relation between the main elements of the embodiment and the main elements of the present disclosure described in Summary. In the embodiment, the battery 36 corresponds to "storage device" and the vehicle ECU 60 corresponds to "controller".

Since the correspondence relation between the main elements of the embodiment and the main elements of the present disclosure described in Summary is an example for specific description of the aspect for carrying out the present disclosure described in Summary, the correspondence relation is not intended to limit the elements of the present disclosure described in Summary. More specifically, the present disclosure disclosed in Summary should be interpreted based on the description therein, and the embodiments are merely specific examples of the present disclosure disclosed in Summary.

Although the aspects for carrying out the present disclosure have been described using the embodiment, the present disclosure is not limited in any manner to the embodiment disclosed. It should naturally be understood that the present disclosure can be carried out in various aspects without departing from the scope of the present disclosure.

The present disclosure can be used in industries such as manufacturing of in-vehicle electric storage systems.

What is claimed is:

1. An in-vehicle power storage system mounted in a vehicle, comprising:
   a power storage device; and
   a controller configured to transmit, in an event of external charging where a charging device charges the power storage device with electric power from an external electric power source, a current indication for the external charging to the charging device, wherein in the event of the external charging, the controller is configured to
   estimate a response speed of the charging device based on change of current in the power storage device due to change of the current indication after start of charging, and
   set the current indication in consideration of the response speed of the charging device after the response speed of the charging device is estimated,
   wherein when the current indication is lowered after the response speed of the charging device is estimated in the event of the external charging, the controller is configured to set the current indication such that a change speed of the current indication is equal to or below the response speed of the charging device.

2. The in-vehicle power storage system according to claim 1, wherein:
   the controller is configured to set the current indication based on a base current indication that is based on a state of charge of the storage device in the event of the external charging; and
   when a temporary overage, indicating an absolute value of a change speed of the base current indication temporarily exceeding the response speed of the charging device, occurs in a case where the base current indication is lowered after the response speed of the charging device is estimated in the event of the external charging, the controller is configured to
   set a limit start time based on a return time at which the absolute value of the change speed of the base current indication returns to a value equal to or below the response speed of the charging device after exceeding the response speed of the charging device, the base current indication at the return time, and the response speed of the charging device, and
   gradually lower the current indication using the response speed of the charging device after the limit start time comes.

3. The in-vehicle power storage system according to claim 1, wherein in the event of the external charging, the controller is configured to estimate, as the response speed of the charging device, a change speed of current of the power storage device when the current indication changes.

4. An in-vehicle power storage system mounted in a vehicle, comprising:
   a power storage device; and
   a controller configured to transmit, in an event of external charging where a charging device charges the power storage device with electric power from an external electric power source, a current indication for the external charging to the charging device, wherein in the event of the external charging, the controller is configured to
   estimate a response speed of the charging device based on change of current in the power storage device due to change of the current indication after start of charging, and
   set the current indication in consideration of the response speed of the charging device after the response speed of the charging device is estimated,
   wherein in the event of the external charging, the controller is configured to estimate, as the response speed of the charging device, a change speed of current of the power storage device when the current indication changes.

* * * * *